US012455618B2

(12) United States Patent
Mendez et al.

(10) Patent No.: US 12,455,618 B2
(45) Date of Patent: Oct. 28, 2025

(54) CONDUCTIVE FABRIC ARCHITECTURE

(71) Applicant: Apple Inc., Cupertino, CA (US)

(72) Inventors: Javier C. Mendez, San Jose, CA (US); Nicholas C. Soldner, Mountain View, CA (US); Darshan R. Kasar, San Francisco, CA (US); Grant H. Mulliken, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/450,378

(22) Filed: Aug. 15, 2023

(65) Prior Publication Data

US 2024/0077940 A1 Mar. 7, 2024

Related U.S. Application Data

(60) Provisional application No. 63/374,740, filed on Sep. 6, 2022.

(51) Int. Cl.
*G06F 3/01* (2006.01)
*G02B 27/01* (2006.01)
*G06F 1/16* (2006.01)
*G06F 3/041* (2006.01)

(52) U.S. Cl.
CPC .......... *G06F 3/012* (2013.01); *G02B 27/017* (2013.01); *G02B 27/0172* (2013.01); *G02B 27/0176* (2013.01); *G06F 1/163* (2013.01); *G06F 3/01* (2013.01); *G06F 3/011* (2013.01); *G06F 3/041* (2013.01)

(58) Field of Classification Search
CPC .............. G02B 27/017; G02B 27/0172; G02B 27/0176; G06F 3/012; G06F 3/041; G06F 3/01; G06F 3/011; G06F 1/163
See application file for complete search history.

(56) References Cited

U.S. PATENT DOCUMENTS

| 10,564,717 | B1* | 2/2020 | Shahmohammadi ... G06F 3/015 |
| 2016/0075121 | A1* | 3/2016 | Kang .................... D06M 17/00 156/60 |
| 2017/0060256 | A1* | 3/2017 | Heck ....................... G06F 3/015 |
| 2018/0271441 | A1* | 9/2018 | Dabby ................. A61B 5/6804 |
| 2019/0015233 | A1* | 1/2019 | Galloway ................ B25J 15/12 |
| 2019/0346928 | A1* | 11/2019 | Shahmohammadi ........................ H04B 13/005 |
| 2020/0159040 | A1* | 5/2020 | Kiritz ................. G02B 27/0176 |
| 2020/0409150 | A1* | 12/2020 | Lee ........................... G02B 7/02 |
| 2021/0156752 | A1* | 5/2021 | Jang ..................... D06N 3/0088 |

OTHER PUBLICATIONS

Coxworth, Ben, ""Smart Fabric" Strain Sensor Combines Strength and Sensitivity", available at: https://newatlas.com/wearables/smart-fabric-strain-sensor/, Nov. 12, 2020.

* cited by examiner

*Primary Examiner* — Cory A Almeida
(74) *Attorney, Agent, or Firm* — DORSEY & WHITNEY LLP

(57) ABSTRACT

A head-mountable device including a display, a housing at least partially surrounding the display, a facial interface attached to the housing, and a cover positioned between the housing and the facial interface, the cover comprising a conductive fabric.

20 Claims, 8 Drawing Sheets

CONDUCTIVE FABRIC ARCHITECTURE

CROSS-REFERENCE TO RELATED APPLICATION(S)

This claims priority to U.S. Provisional Patent Application No. 63/374,740, filed 6 Sep. 2022, and entitled "Conductive Fabric Architecture," the entire disclosure of which is hereby incorporated by reference.

FIELD

The described embodiments relate generally to light seals for head-mountable devices. More particularly, the present disclosure relates to light seals for head-mountable devices that include conductive fabrics.

BACKGROUND

Recent advances in portable computing have enabled head-mountable devices that provide augmented and virtual reality (AR/VR) experiences to users. Such head-mountable devices typically include various components such as a display, viewing frame or housing, lens, battery, motor, speaker, and other components. These components can operate together to provide an immersive user experience. There is a need for head mountable-devices having components that help provide a distraction-free setting by blocking or sealing off the outside environment (e.g., ambient light). One way this can be accomplished is through the use of a light seal that defines an enclosed "eye-box" between the display and the user's eyes.

Further, there is a need for head-mountable devices to have increased and improved functionality. The improved functionality should preferably operate without the need to increase the size or weight of the head-mountable device. Indeed, the improved functionality should preferably utilize existing components to seamlessly integrate with the head-mountable device. The present disclosure addresses the desire for additional functionality by incorporating conductive fabric with the light seal.

SUMMARY

In some examples, a head mountable device includes a display, a housing at least partially surrounding the display, a facial interface attached to the housing, and a cover positioned between the housing and the facial interface, the cover including a conductive fabric.

In some examples of the head-mountable device, the facial interface directly contacts a face of a user, the cover blocks ambient light, the conductive fabric elastically deforms in response to a movement of the cover, and an electrical property of the conductive fabric detectably changes in response to the movement.

In additional examples, the conductive fabric is elastic. Additionally, the conductive fabric can be interwoven with the cover. During use, the geometry of the conductive fabric can change in response to a user input. In other examples, the conductive fabric is configured to detect a change in a distance between the housing and the facial interface. In yet other examples, the conductive fabric forms a serpentine pattern. In some instances, the conductive fabric includes an array of parallel conductive threads arranged perpendicular to a direction of deformation of the cover, and a distance between two of the parallel conductive threads changes in response to a facial movement of a user. The conductive fabric can include a user input member.

In some examples, a wearable electronic device can include a display, a frame at least partially surrounding the display, and a light-blocking material attached to the frame, the light-blocking material including a conductive fabric.

In some examples the conductive fabric elastically deforms in response to a facial movement of a user. Additionally, a capacitance of the conductive fabric can detectably change in response to a deformation of the conductive fabric. In some examples, the conductive fabric includes or acts as a switch. In other examples, the conductive fabric electrically connects a first electronic component and a second electronic component. In other examples the conductive fabric directly contacts a user's skin. In some instances the conductive fabric includes a touch-sensitive input member.

In other embodiments a facial interface for a head-mountable device can include a facial contact, a conductive component incorporated into the facial contact, the conductive component configured to generate a signal based on a change in a capacitance of the conductive component, and a processor connected to the conductive component.

In some examples the facial contact is positioned adjacent a nasal region when the head-mountable device is worn by a user. In other examples, the conductive component is configured to detect a facial expression.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
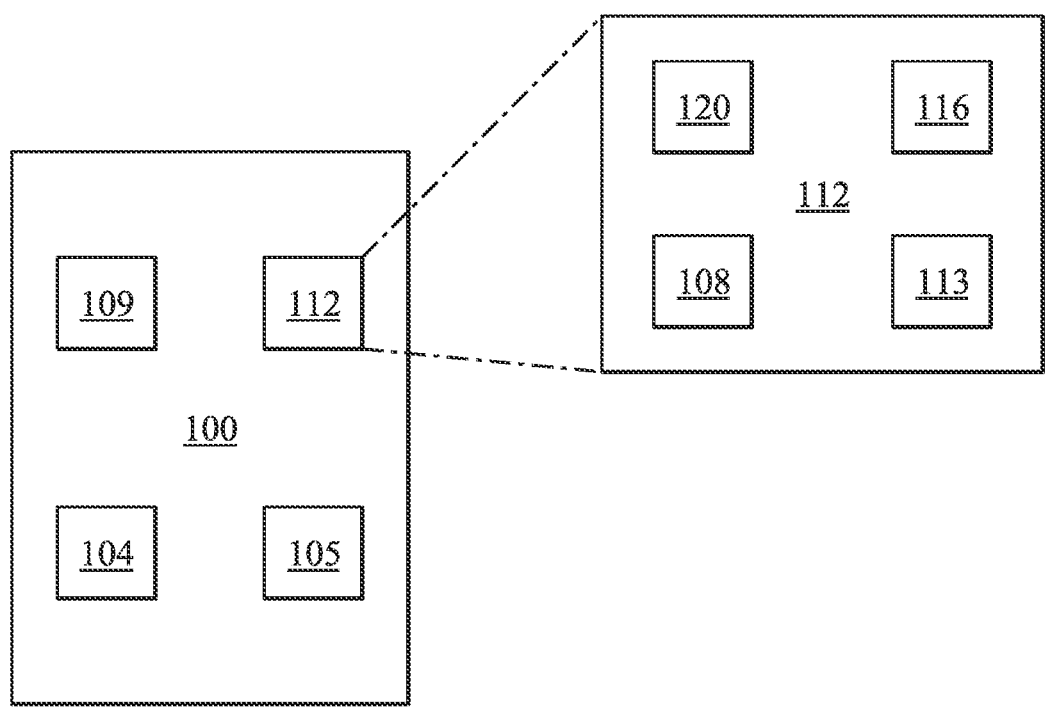
FIG. 1A shows a schematic block diagram of a head-mountable device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a head-mountable device. More particularly, the present embodiments relate to a light seal of a head-mountable device including conductive fabric. As used herein "conductive fabric" can refer to the material or fabric into/onto which conductive elements are incorporated, or can also refer to the conductive elements themselves, separate from the material or fabric with which they are integrated. The conductive fabric can act as sensors, input members, and electrical interconnects to enable sensors and other electronic components to interact with one another. An input member can be any button, switch, capacitive surface, dial, slider, or other physically activated input system that can be used to provide an indication to a processor of a user's intent.

Conventional head-mountable devices equipped with sensors are utilized for various purposes that detect limited user feedback, such as movement or positioning feedback, providing limited information in response to the user. These conventional sensors and electrical interconnects are often located in non-ideal and burdensome locations, taking up much needed space and unable to seamlessly integrated with the existing HMD architecture.

By contrast, the head-mountable device of the present disclosure includes a light seal with conduct fabric that collects user information, captures changes in user motion, such as facial movements, and can receive user input, such as touch input. The conductive fabric can accomplish this while being unobtrusively integrated with the light seal. A head-mountable device with such conductive fabrics accomplishes increased functionality without adding burdensome components or structures.

There are a number of different uses for "smart" conductive fabric described herein. For example, the disclosed conductive fabrics can be used for: detecting respiration patterns and amplitudes, receiving user input (such as touch/force inputs and playback controls), detecting facial expressions, detecting tension or force on a user's face from the facial interface and/or headband support, raising or lowering the temperature of the light seal, moisture detection, and low power "on-head" detection of when the HMD is being handled or worn by the user.

These and other embodiments are discussed below with reference to FIGS. 1A-7. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A illustrates a block diagram of a head-mountable device 100 including a frame 104, a display 105, a support 109, and a light seal 112. The display 105 can include one or more optical lenses or display screens in front of the eyes of a user. The display 105 can include a display for presenting an augmented reality visualization, a virtual reality visualization, or other suitable visualization. Additionally, the display 105 can be positioned at least partially in or on the frame 104. Similarly, the light seal 112 can be connected to the frame 104. In some examples, the light seal 112 includes the frame 104 (i.e., the frame 104 is part of the light seal 112).

The light seal 112 can include electrical components (e.g., sensors 120), a cover 113, a facial interface 108, and conductive fabric 116. The frame 104 can be a housing of the display 105. Further, the frame 104 can also be considered to be a part of or separate from the light seal 112. As used herein, the term "light seal" can refer to a portion of the head mountable device 100 that engages or shields a user's face. In particular, the light seal 112 includes portions (e.g., the facial interface) that conform to, contact, or press against regions of the user's face.

The light seal 112 can include a pliant (or semi-pliant) facetrack or face engagement component that spans the forehead, wraps around the eyes, contacts other regions of the face (e.g., zygoma and maxilla regions), and bridges the nose. In addition, the light seal 112 can include various components forming a frame, structure, or webbing of a head-mountable device disposed between the display 105 and the user's skin, such as the cover 113. The cover 113 can include a seal, environment seal, dust seal, air seal, etc. that is positioned between the gap between the display 105 and the user's face. The cover 113 can be a woven fabric that is non-rigid or deformable. The cover 113 can be elastically deformable. In some examples, the cover 113 can be a plastic, rubber, or polymer material. In some examples, the cover 113 can be rigid.

The cover 113 can form an eye-box through which the user can view the display 105. It will be appreciated that the term "seal" can include partial seals or inhibitors, in addition to complete seals (e.g., a partial light seal where come ambient light is blocked and a complete light seal where all ambient light is blocked when the head-mountable device 100 is donned).

The light seal 112 can be removably attached to the frame 104 and in electrical communication with the display 105. The light seal 112 can include an electrical component 120, such as a sensor 120. The sensor 120 can collect user or environmental data, such as biometric information. The sensor 120 can transmit signals to the HMD, and more particularly to the display 105. The sensor 120 can transmit signals to an output configured to perform an action in response to the information collected by the sensor 120.

The light seal 112 can include conductive fabric 116. In some examples, the conductive fabric 116 can include highly elastic copper threads that can compress and stretch while still maintaining electrical connectivity. The conductive fabric 116 can be elastically deformable (i.e., capable of temporary change in length, volume, or shape). In some examples, the conductive fabric 116 can include electrically conductive carbon fibers. In some examples, the conductive fabric 116 can collect biometric information of the user. More specifically, the biometric information of the user can manifest itself in movement of the user's face (e.g., nasal movements indicative of respiration or breathing patterns). These movement can cause a change in the conductive fabric (i.e., stretching or compressing). The degree or amount to which the conductive fabric is moved by the user's facial movements can be detectable by the conductive fabric and can be used to generate signals that can be analyzed by a processor of the HMD 100. As described in greater detail below, the conductive fabric can be a thread, line, wire, plate, or any other structure that is capable of conducting electricity. The conductive fabric 116 can be integrated with the light seal 112. For example, the conductive fabric 116 can be embedded, interwoven, or encapsulated with the cover 113 or facial interface 108.

The display 105, being in electrical communication with the light seal 112, and more specifically with the conductive fabric 116, can receive electrical communication and provide feedback to the user related to the readings of the conductive fabric 116 (e.g. visual feedback, audio feedback, haptic feedback, etc.).

As used herein, the term "sensor" refers to one or more different sensing devices, such as a camera or imaging device, temperature device, oxygen device, movement device, brain activity device, sweat gland activity device, breathing activity device, muscle contraction device, etc. In some examples, the sensor can sense biometric features including features of the autonomic nervous system. Some particular examples of sensors include an electrooculography sensor, electrocardiography sensor, EKG sensor, EEG sensor for measuring neural activity, heart rate variability sensor, blood volume pulse sensor, SpO2 sensor, compact pressure sensor, electromyography sensor, core-body temperature sensor, galvanic skin sensor, accelerometer, gyroscope, magnetometer, inclinometer, barometer, infrared sensor, global positioning system sensor, etc. Additional sensor examples can include, contact microphones (e.g., press based MEMS), bioelectrical activity sensors, UV exposure sensors, or particle sensors.

Any of the features, components, and/or parts, including the arrangements and configurations thereof shown in FIG. 1A can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1A.

Figure 1B:
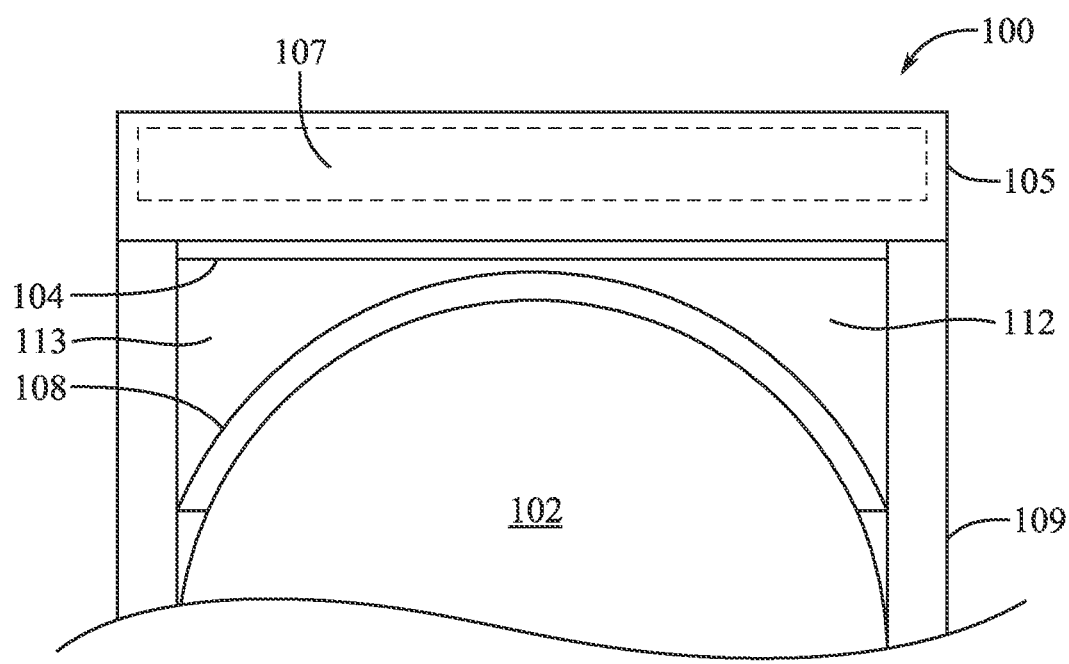
FIG. 1B shows a top view of a head-mountable device.

FIG. 1B shows a top partial view of a head-mountable device 100. The head-mountable device 100 of FIG. 1 can be substantially similar to, including some or all of the features of, the head-mountable device 100 described in FIG. 1A. The HMD 100 can include a display (also referred to as a display unit, or housing) 105 and a retention band 109. The display 105 can include any number of internal electronic components 107. The HMD 100 can include a frame 104 (which can also be referred to as a housing) attached to the display 105. In some examples, the display 105 includes an opaque, translucent, transparent, or semi-transparent screen, including any number lenses, for presenting visual data. The frame 104 can at least partially border one or more edges of the display 105. The frame 104 can be attached to a cover 128 at one end of the cover 128. At an opposite end, the cover 128 can form, or be attached to, a facial interface 108. In some examples, the frame 104, cover 113, and facial interface 108 can together form the light seal 112. It will be understood, however, that the light seal 112 can include fewer or more components that those listed or shown.

The HMD 100 can be worn on a user's head 102 such that the display 105 is positioned over the user's face and disposed over one or both of the user's eyes. The display 105 can be connected to the retention band 109 and/or the light seal 112. In some examples, the retention band 109 can be positioned against the side of a user's head 102 and in contact therewith. In some examples, the retention band 109 can be at least partially positioned above the user's ear or ears. In some examples, the retention band 109 can be positioned adjacent to the user's ear or ears. The retention band 109 can extend around the user's head 102. In this way, the display 105 and the retention band 109 can form a loop that can retain the wearable electronic device 100 on the user's head 102. It should be understood, however, that this configuration is just one example of how the components of a modular wearable electronic device 100 can be arranged, and that in some examples, a different number of connector straps and/or retention bands can be included. Although the particular component 100 can be referred to as an HMD, it should be understood that the terms wearable device, wearable electronic device, HMD, HMD device, and/or HMD system can be used to refer to any wearable device, including smart glasses.

In some examples, the frame 104 is attached to a facial interface 108. The facial interface 108 can contact a user's head and/or face. In some examples, the cover 113 can be a light blocking component that extends between the frame 104 and the facial interface 108. The light blocking component can cover or surround a perimeter of the frame 104 and/or the facial interface 108.

The cover 113 can be a cloth, fabric, woven material, plastic, rubber, or any other suitable opaque or semi-opaque material. In some examples, the cover 113 is flexible, having the ability to repeatedly stretch, compress, and deform. The cover 113 can be elastically or in-elastically deformable. The facial interface 108 in combination with the cover 113 can block outside light and limits the peripheral view of the user 102. In some examples, the cover 113 and the facial interface 108 is the same or a unitary component. As will be discussed in greater detail below, the light seal 112 can include a conductive fabric that is able to serve multiple functions and provide added benefits and functionality to the HMD 100.

Any of the features, components, and/or parts, including the arrangements and configurations thereof shown in FIG. 1B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1B.

Figure 2:
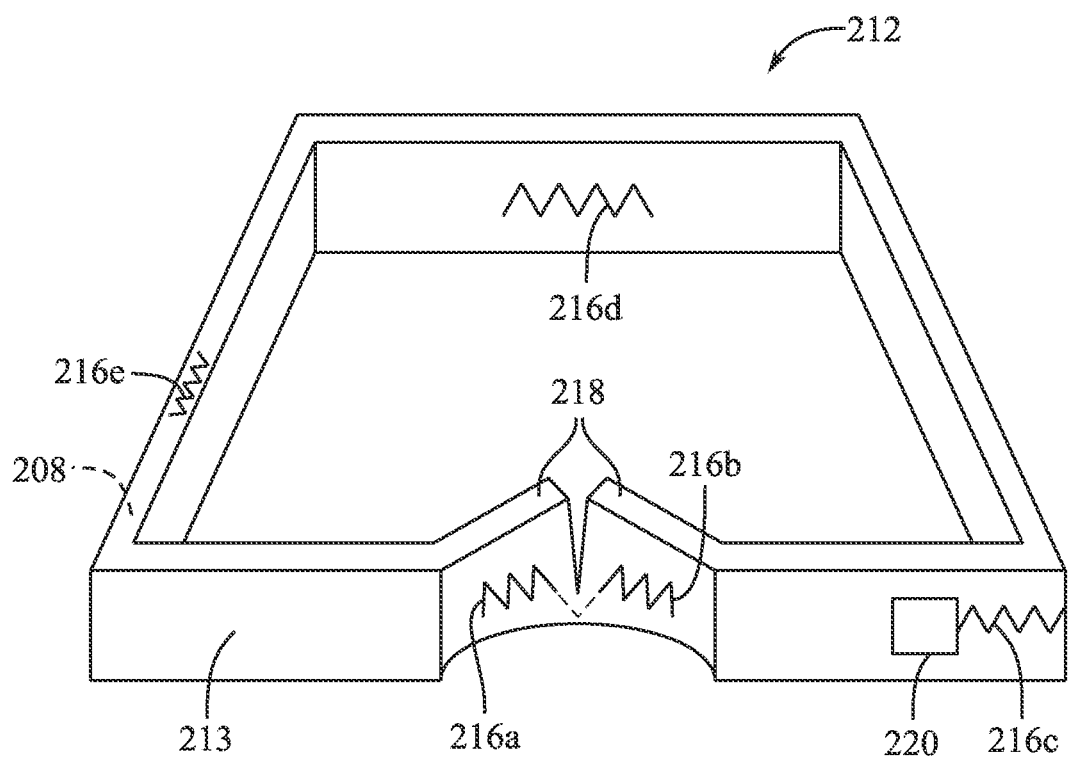
FIG. 2 shows a bottom perspective view of a light seal.

FIG. 2 shows a bottom perspective view of select components of a light seal 212. The light seal 212 can be substantially similar to, including some or all of the features of, the light seals described herein, such as light seal 112. The light seal 212 can be implemented on an HMD, such as HMD 100.

The light seal 212 can be integrated with conductive fabrics 216a, 216b, 216c, 216d, and 216e (collectively referred to as conductive fabric 216). The conductive fabric 216 or thread can be positioned at various locations on the light seal 212. For example, the conductive fabric 216 can be positioned on or in the cover (e.g., embedded, encapsulated, or interwoven into the cover)

In some examples, the conductive fabric 216 can be positioned on the facial interface 208 of the light seal 212. In one example, the conductive fabric 216 can be in direct contact with a user, for example, touching a user's forehead, cheek, nose, temple region, back of the head, or at any location where the HMD contacts the user.

The light seal 212 can include a nasal region 218 that is configured to contact a user's nose. The nasal region 218 can be considered part of the facial interface 208 and/or the cover 213, or can be its own separate section of the light seal 212. The nasal region 218 can include two sections corresponding to each side of a user's nose. As illustrated in FIG. 2, conductive threads 216a can be positioned in the nasal region 218. In some examples, the conductive thread 216a is a single continuous wire that spans the nasal region 218 (i.e., both sides of the nose and across the bridge of the nose). In some examples, each side of the nasal region 218 of the light seal 212 can include separate or distinct conductive threads 216*a*.

The conductive thread 216*a* can be intentionally located to detect movements of the user's nose. For example, when a user breathes, the nose can move a certain amount based on the intensity or amplitude of the breath. This movement can in turn cause the nasal region 218 of the light seal 212 to change shape or move (e.g., compress or stretch). The conductive thread 216*a* can be ideally positioned such that as the nasal region 218 moves in response to nasal movements. The conductive threads 216 are likewise stretched or compressed by nasal movements.

The movement of the conductive thread 216*a* can result in a detectable change in the conductivity and/or capacitance of the conductive threads 216, which can be used to infer respiration or facial expression data. As used herein "detectable" can refer to a change in a signal generated by the conductive fabric that is able to be recognized and analyzed by a processor. In some examples, the conductive threads 216 can directly contact the user's nose and can be impacted by the capacitance of the user's nose. In some examples, the conductive threads 216*a* are embedded, encapsulated, or interwoven into the material of the nasal region (i.e., the fabric of the cover 213 and/or the facial interface 208) such that the conductive threads 216*a* do not directly contact the user's skin, but still respond to movements of the user's face relative to the light seal 212.

The light seal 212 can include a forehead region that is configured to contact a user's forehead when the HMD is donned by the user. The forehead region can be impacted (e.g., moved by) movements of the user's forehead and/or eyebrows. As illustrated in FIG. 2, conductive threads 216*d* can be positioned in the forehead region of the cover 213. In some examples, the conductive thread 216*d* is a single continuous wire that spans a substantial portion of the forehead region. In some examples, the forehead region of the cover 213 includes multiple conductive threads 216*d* (e.g., one over each eyebrow).

The conductive thread 216*d* can be intentionally located to be able to detect movements of the user's forehead and/or eyebrows. For example, a user's facial expression can be inferred from the position and movements of the forehead. This movement can in turn result in movements of the light seal 212. The conductive thread 216*d* can be ideally positioned such that as the forehead moves, the conductive thread 216*d* are likewise stretched or compressed. This movement of the conductive thread 216*d* can result in a detectable change in an electrical property (e.g., conductivity and/or capacitance) of the conductive thread 216*d*, which can be used to infer biometric information, such as facial expressions. In some examples, the conductive threads 216*d* can directly contact the user's skin and can be excited by the capacitance of the user's skin. In some examples, the conductive threads 216*d* are embedded, encapsulated, or interwoven into the material of the nasal region (i.e., the fabric of the cover 213 and/or the facial interface 208) such that the conductive threads 216*d* do not directly contact the user's skin, but still respond to movements of the user's face relative to the light seal 212.

The light seal 212 can include a facial interface 208 that is configured to directly contact and conform against the user's face when the HMD is donned by the user. The facial interface 208 can be a distinct components from the cover 213 or can be a single unitary piece of the cover 213. For example, the facial interface 208 can include foam that is attached to the cover 213. The facial interface can be impacted (e.g., moved by) movements of the user's face. As illustrated in FIG. 2, conductive threads 216*e* can be positioned in/on the facial interface 208.

The conductive thread 216*e* can be intentionally located to be able to detect movements of the user's face. Movement of the user's face can transfer to movement of the facial interface 208 and movements of the conductive thread 216*e*, resulting in a detectable change in an electrical property (e.g., conductivity and/or capacitance) of the conductive thread 216*e*. In some examples, the conductive threads 216*e* can directly contact the user's skin and can be excited by the capacitance of the user's skin. In some examples, the conductive threads 216*e* are embedded, encapsulated, or interwoven into the material of the facial interface such that the conductive threads 216*e* do not directly contact the user's skin, but still respond to movements of the user's face relative to the light seal 212. In some examples, the conductive fabric 216*e* can be interwoven into the facial interface 208 while still being exposed and capable of contacting the user's face.

The light seal 212 can include one or more electronic components 220. The electronic component 220 can be any form of module, sensor, unit, input, or output that performs a function of the light seal 212 and/or the HMD. For example, the component 220 can be a battery, processor, haptic actuator, LED, display, speaker, biometric sensor, etc.

The component 220 can be positioned at various locations on the light seal 212. The component 220 can be positioned on or in the cover (e.g., embedded, encapsulated, or interwoven into the cover). In some examples, the component 220 can be positioned on the facial interface 208 or the frame of the light seal 212. In one example, the component 220 can be in direct contact with a user, for example, touching a user's forehead, cheek, nose, temple region, back of the head, or at any location where light seal 212 contacts the user's head.

In some examples, a conductive fabric 216*c* can be electrically connected to the component 220. The conductive fabric 216*c* can be an interconnect to electrically connect the components with another component of the HMD. In some examples, the component 220 is a processor configured to analyze the signals transmitted/generated by the conductive thread 216*c*.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
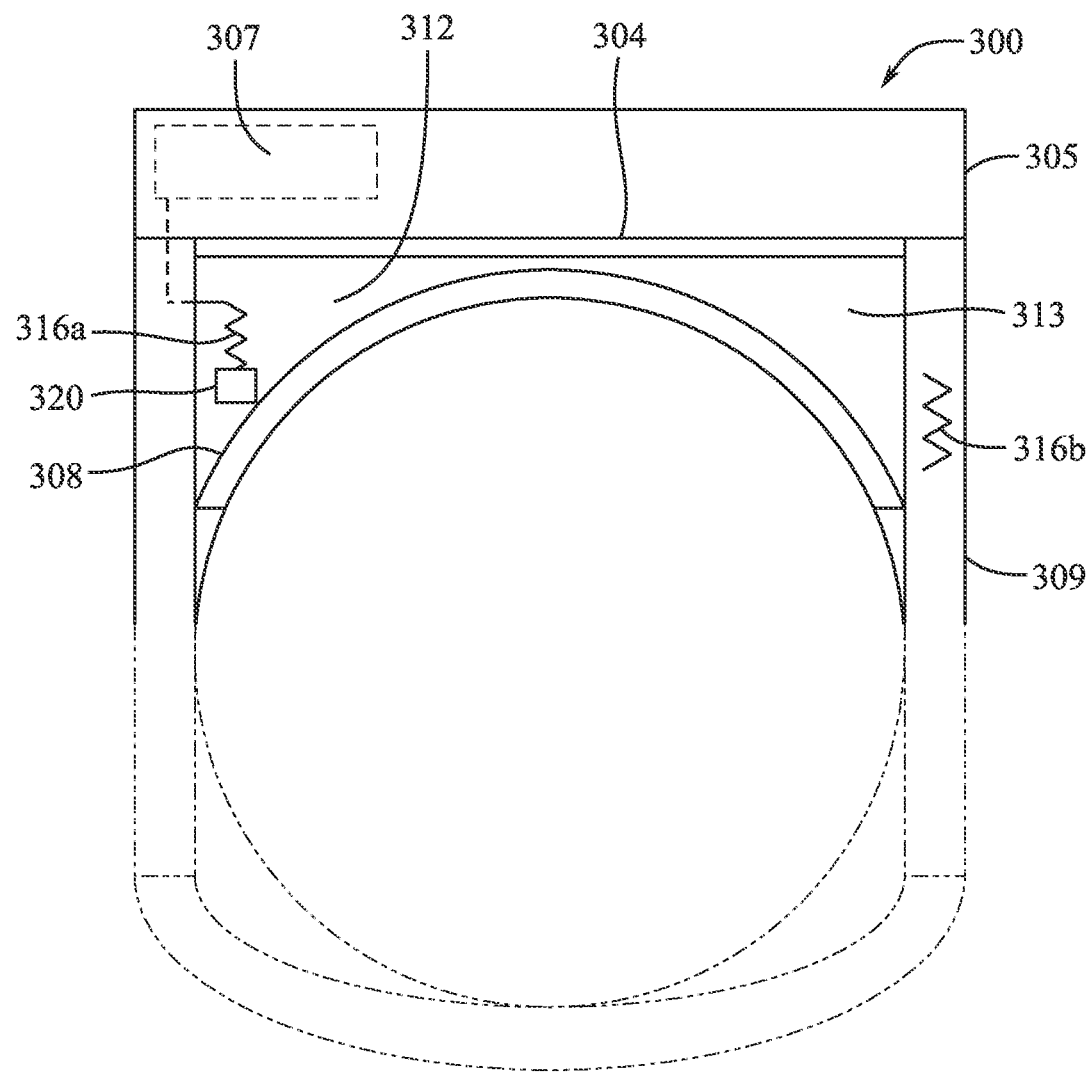
FIG. 3 shows a top view of a head-mountable device.

FIG. 3 shows a top view of a head-mountable device (HMD) 300. The HMD 300 can be substantially similar to, including some or all of the features of, the devices described herein, such as HMD 100 and light seal 212. In some examples, the HMD 300 can include an electronic module 307. The electronic module 307 can be positioned on or housed in the display unit 305. The electronic module 307 can be a battery, a processor, a display, a camera, or any other electronic component. In some examples the electronic module 307 can be attached to the frame 304. The electronic module 307 can be in electrical communication with an electronic component 320 attached to the light seal 312.

In some examples, the electronic component 307 and the electronic module 320 can be electrically connected by a conductive fabric 316a that runs through the cover 313 of the light seal 312. In some examples, the conductive fabric 316a runs through or across the headband or support 309. In some examples, the conductive fabric 316a runs through or across the frame 304. In this manner, the conductive fabric 316a serves as an interconnect (i.e., electrical connection) between the electronic component 320 on the light seal 312 and the electronic module 307. In some examples, the detections of the conductive fabrics 216 can be combined with other sensors on-board or remote from the HMD 300 to gather data is a sensor fusion manner. For example, the conductive threads in combination with user facing cameras can be used for facial expression detection.

In some examples, the HMD 300 can include a conductive fabric 316b incorporated onto and/or into the support 309 of the HMD 300. The support 309 can be a headband having flexible sections. The conductive fabric 316b can be configured to stretch or compress in response to the headband 309 stretching or compressing. In some examples, the conductive fabric 316b can generate signals indicative of the tightness or position of the headband. In some examples, a user can be notified based on the signals generated by the conductive fabric 316b. The headband 309 can be automatically adjusted based on the signals generated by the conductive fabric 316b.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4A:
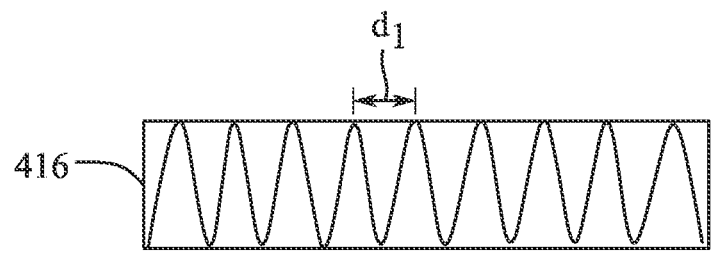
FIG. 4A shows a conductive fabric in a neutral state.

FIG. 4A shows a conductive fabric 416 in a neutral or rest state. In some examples, the conductive fabric 416 is positioned in a serpentine pattern (curving, undulating, or winding in a repeated pattern). As illustrated in FIG. 4A, in a rest or neutral state (i.e., when no external forces are acting on the conductive fabric 416, the nodes or peaks of the conductive fabric 416 can be a distance $d_1$ from each other. The distance $d_1$ can be visualized as the wavelength or distance between parallel sections of the conductive fabric 416.

By monitoring the electrical current passing through the conductive fabric, a processor can determine the amount and direction of strain the fabric is experiencing. In some examples, the conductive fabric 416 arranged in a serpentine pattern can be excited using a 100-140 kHz sine or square wave to generate a capacitive field. The system can then monitor for changes in the alternating current (AC) component over time (e.g., to determine respiration data). In some examples, a frequency sweep is performed to acquire a frequency/phase dependent signal.

In some examples, the geometry or shape of conductive threads 416 can be tuned depending on what is being monitored and the required sensitivity levels. In some examples, the system primarily monitors the change in capacitance of the conductive threads 416.

Figure 4B:
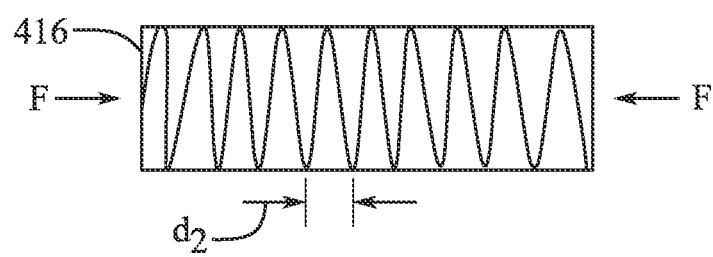
FIG. 4B shows the conductive fabric of FIG. 4A in a compressed state.

FIG. 4B shows the conductive fabric 416 in a compressed state. The compressed state may be the result of the light seal (such as the cover and/or facial interface) being acted upon by the user. In the compressed state, the distance separating the peaks or the parallel sections of the conductive fabric is a distance $d_2$. The distance $d_2$ can be less than the distance $d_1$. As a result, the conductive properties (e.g., capacitance) of the conductive fabric can change in a detectable manner. Thus, it can be determined that the conductive fabric 416 is compressed and even the degree to which the conductive fabric 416 is compressed. From this, biometric information, facial expression, breathing patterns, user input, and other user information can be determined.

Figure 4C:
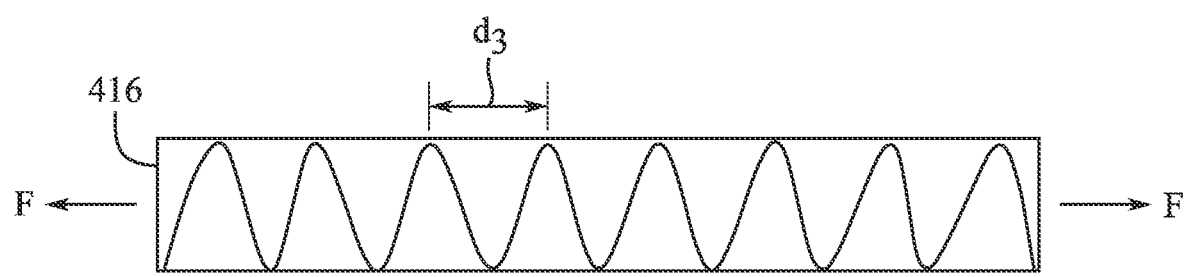
FIG. 4C shows the conductive fabric of FIG. 4A in a stretched state.

FIG. 4C shows the conductive fabric 416 in a stretched state. The stretched state may be the result of the light seal (such as the cover and/or facial interface) being acted upon by the user. In the stretched state, the distance separating the peaks or the parallel sections of the conductive fabric is a distance $d_3$. The distance $d_3$ can be greater than the rest distance $d_1$. As a result, the conductive properties of the conductive fabric change in a detectable manner as the area and geometry of the conductive fabric 416 is modified. Thus, it can be determined that the conductive fabric 416 is stretched and even the degree to which the conductive fabric 416 is stretched. From this, biometric information, facial expression, breathing patterns, user input, and other user information can be determined.

Any of the features, components, and/or parts, including the arrangements and configurations thereof shown in FIGS. 4A-4C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4C.

Figure 5A:
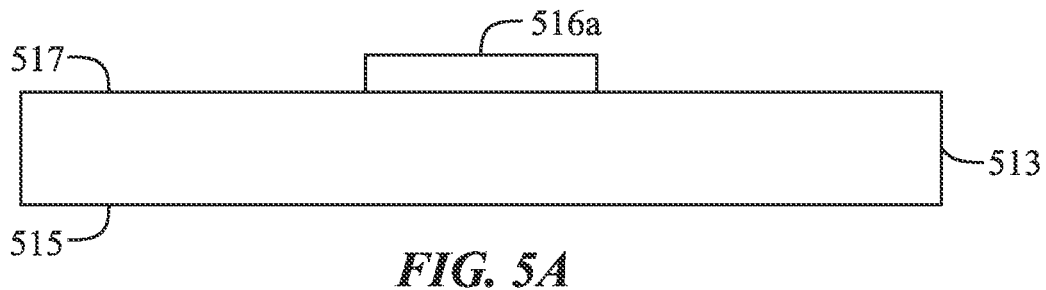
FIG. 5A shows a conductive component on an exterior of a cover.

FIG. 5A shows a conductive component 516a on an exterior 517 of a cover 513. The conductive component 516a can be substantially similar to, including some or all of the features of, the conductive fabrics described herein, such as conductive fabric 216, 316, and 416. As described herein, a light seal can include a cover 513 that extends between the HMD and the user's face. The cover 513 can define a hollow, aperture, or opening that forms an internal volume or eye-box. The cover 513 can therefore include an internal or interior surface 515 that defines the internal volume, and an exterior surface 517 that defines an exterior of the light seal.

As illustrated in FIG. 5A, the conductive component 516a, can be positioned on the exterior surface 517. In some examples, the conductive component 516a at least partially defines the exterior of the light seal. In some examples, the conductive component 516a is accessible to the user from the exterior of the HMD. For example, the conductive component 516a can be responsive to a user's touch or deformation of the conductive component 516a. In this manner, a user who is wearing the HMD can control or provide input by touch (e.g., tapping or sliding a finger) or physically manipulation (e.g., deforming) the conductive component 516a with their hand. The conductive component 516a can be attached to the cover 513 using any suitable methods, including but not limited to adhesion, molding, mechanical fasteners, friction, weaving, magnets, etc.

Figure 5B:
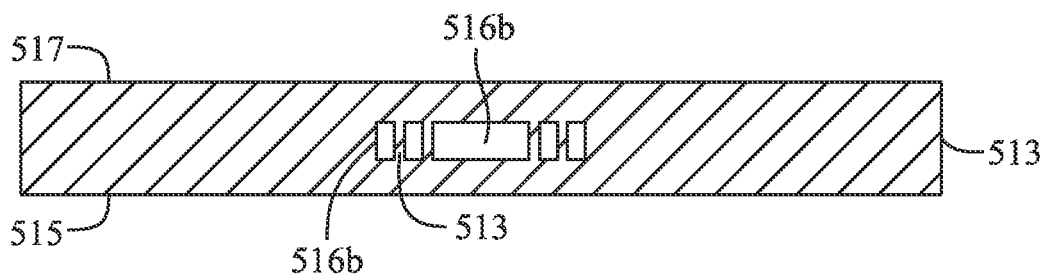
FIG. 5B shows a conductive component interwoven into a cover.

FIG. 5B shows a conductive component 516b interwoven into the cover 513. The conductive component 516b can be substantially similar to, including some or all of the features of, the conductive fabrics described herein, such as conductive fabric 216, 316, 416, and 516a. As described herein, a light seal can include a cover 513 that extends between the HMD and the user's face. The cover 513 can be made from a fabric or material having a thickness within which the conductive component 516b can be deposited.

As illustrated in FIG. 5B, the conductive component 516b, can be positioned in (e.g., surrounded, encapsulated, embedded, interwoven, etc.) the cover 513. In some examples, the conductive component 516b at least partially defines the exterior of the light seal. In some examples, at least a portion of the conductive component 516b is accessible to the user from the exterior of the HMD, even while being woven into the cover 513. For example, the conductive component 516b can be responsive to a user's touch or deformation of the conductive component 516b. In this manner, a user who is wearing the HMD can control or provide input by touch or physically manipulation the conductive component 516b (e.g., with their hand). The conductive component 516b can be attached to the cover 513 using any suitable methods, including but not limited to adhesion, molding, mechanical fasteners, friction, weaving, magnets, etc. Further, it will be understood that as the cover 513 is deformed (e.g., by movements of the user's face) the embedded or interwoven conductive component 516b can likewise be deformed. This deformation change the conductive properties of the conductive component 516b is a detectable manner, which can then cause the HMD to perform an action.

Figure 5C:
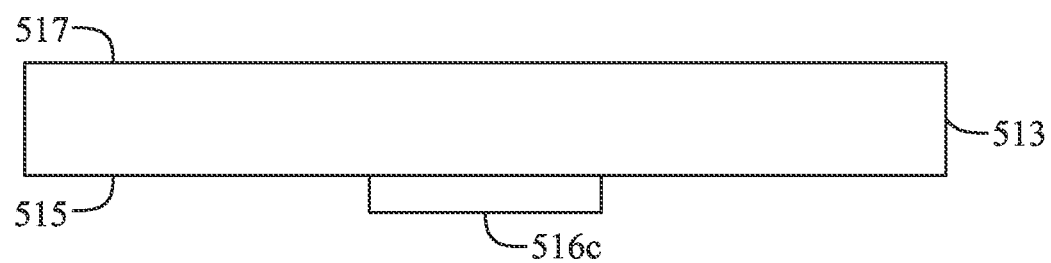
FIG. 5C shows a conductive component on an interior of a cover.

FIG. 5C shows a conductive component 516c on an interior 515 of the cover 513. The conductive component 516c can be substantially similar to, including some or all of the features of, the conductive fabrics described herein, such as conductive fabric 216, 316, 416, 516a, and 516b. As described herein, a light seal can include a cover 513 that extends between the HMD and the user's face. The cover 513 can define a hollow, aperture, or opening that forms an internal volume or eye-box. The cover 513 can therefore include an internal or interior surface 515 that defines the internal volume, and an exterior surface 517 that defines an exterior of the light seal.

As illustrated in FIG. 5C, the conductive component 516c, can be positioned on the interior surface 515. In some examples, the conductive component 516c at least partially defines the interior surface of the light seal. In some examples, the conductive component 516c is accessible to the face of the user from the interior of the light seal. For example, the conductive component 516c can be responsive to a user's facial touch or movements. The conductive component 516c can be attached to the cover 513 using any suitable methods, including but not limited to adhesion, molding, mechanical fasteners, friction, weaving, magnets, etc.

Figure 5D:
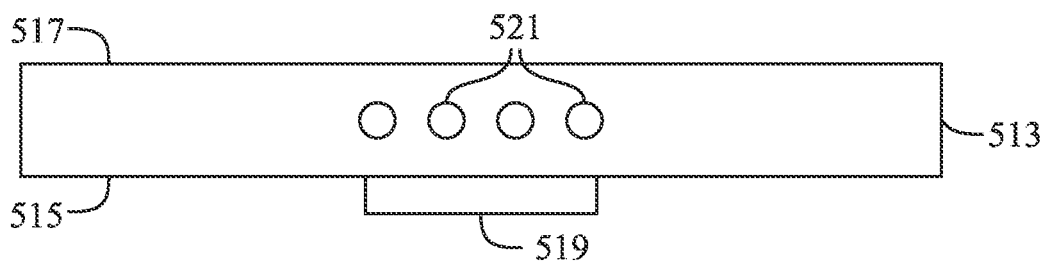
FIG. 5D shows free-floating conductive components.

FIG. 5D shows free-floating conductive components. In some examples, the light seal includes a continuous conductive plate 519 free-floating (i.e., not anchored) in/on the cover 513 in a position that cover, overlays, overlaps, or is adjacent to conductors 521 deposited in the cover 513. In this manner, the deposited conductors 521 can freely move and still provide signals representative of the deformations of the cover 513, even if not galvanically connected to the plate 519. It will be understood that a light seal can include multiple conductive components, conductive fabrics, and plates. For example, a cover 513 can include one or more of the conductive component arrangements described with reference to FIGS. 5A-5D. In some examples, the conductive components includes metal material that is deposited (e.g., using laser direct structuring (LDS) methods) onto fabric of the cover and/or facial interface. In some examples, the conductive components could be a combination of rigid and flexible conductive materials.

Any of the features, components, and/or parts, including the arrangements and configurations thereof shown in FIGS. 5A-5D can be included, either alone or in any combination, in any of the other examples of devices, features, components, and parts shown in the other figures, including in any of FIGS. 5A-5D, described herein. Likewise, any of the features, components, and/or parts, including the arrangements and configurations thereof shown and described with reference to the other figures can be included, either alone or in any combination, in the example of the devices, features, components, and parts shown in FIGS. 5A-5D.

Figure 6:
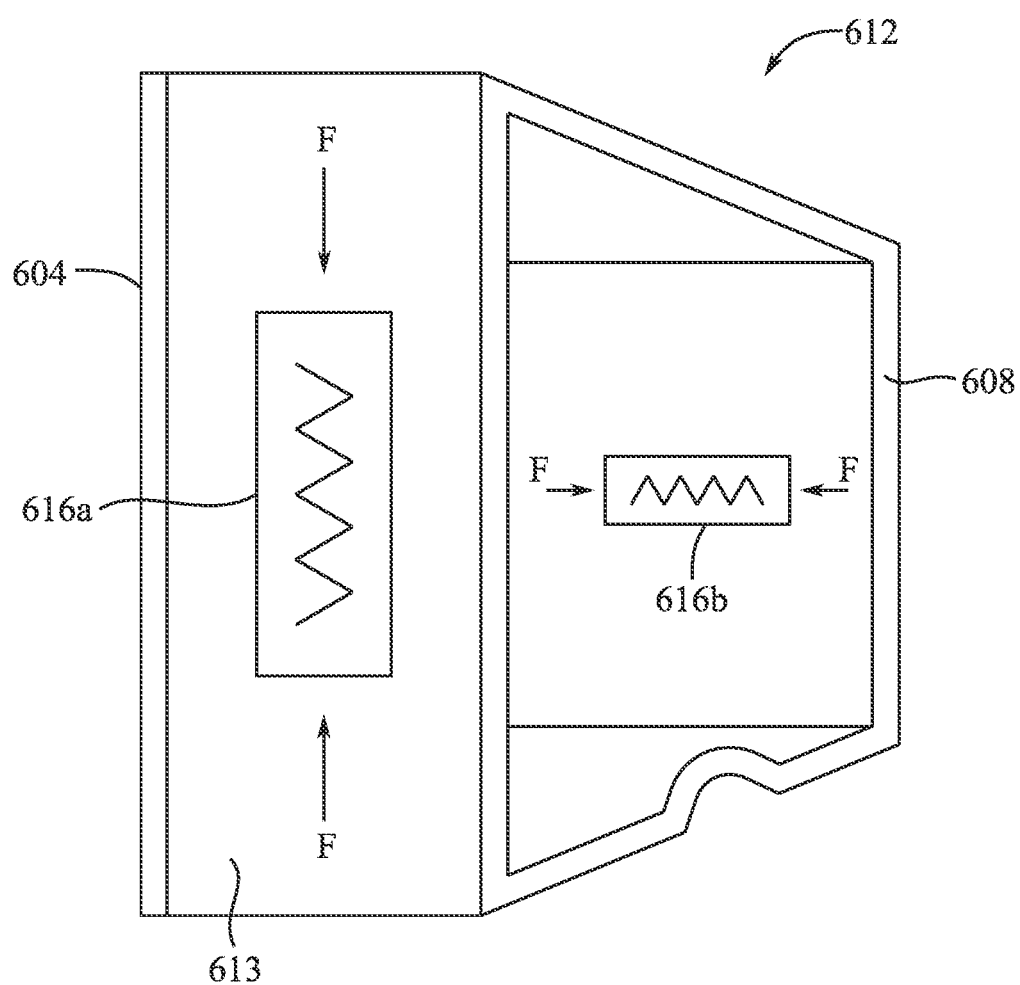
FIG. 6 shows a side perspective view of a light seal.

FIG. 6 shows a side perspective view of a light seal 612. The light seal 612 can be substantially similar to, including some or all of the features of, any of the light seals described herein, such as light seal 112, 212, and 312. The light seal 612 can include a frame 604 configured to attached to a display unit, a facial interface 608 configured to contact and conform to a user's face, and a cover 613 extending between the frame 604 and the facial interface 608 and establishing a light-blocking component or shielding.

The cover 613 can include a first conductive fabric 616a that is connected to the cover 613 in a fashion described herein. The first conductive fabric 616a can include a wire or thread arranged in a generally serpentine pattern or in a zig-zag pattern. In some examples, the first conductive fabric 616a can include a geometry that is responsive to (i.e., prone to move) force in the vertical direction (as oriented in FIG. 6).

The configuration of the conductive fabric 616a can be ideal for receiving user input. For example, the user can squeeze or pinch the cover 613 along the vertical axis to provide input to the system. In some examples, the conductive fabric 616a can be configured to detect an inward force, orthogonal to the surface plane of the side of the cover 613. For example, the conductive fabric 616a can detect the user pushing the cover inward with their finger (e.g., toward the user's temple).

In some examples, the cover 613 can include a second conductive fabric 616b that is connected to the cover 613 in a fashion described herein. The second conductive fabric 616b can be oriented substantially perpendicular to the first conductive fabric 616a. In other words, a longitudinal axis of the first conductive fabric 616a can be perpendicular to the longitudinal axis of the second conductive fabric 616b. It will be understood that the light seal 612 can include one of or both the first conductive fabric 616a and the second conductive fabric 616b. The conductive fabric 616b can include a wire or thread arranged in a generally serpentine pattern or in a zig-zag pattern. In some examples, the conductive fabric 616b can include a geometry that is responsive to a force in the horizontal direction (as oriented in FIG. 6).

The configuration of the conductive fabric 616b can be ideal for receiving user input. For example, the user can squeeze or pinch the cover 613 along the horizontal axis to provide input to the system. In some examples, the conductive fabric 616b is sensitive to changes in the distance between the frame 604 and the facial interface 608. A user can provide input by pressing the display unit or frame 604 toward the facial interface 608. In some examples, the conductive fabric 616b can be configured to detect an inward force, orthogonal to the surface plane of the side of the cover 613. For example, the conductive fabric 616b can detect the user pushing the cover inward with their finger (e.g., toward the user's temple). In some examples, the light seal 612 can include multiple serpentine patterned conductive threads that run parallel to one another.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
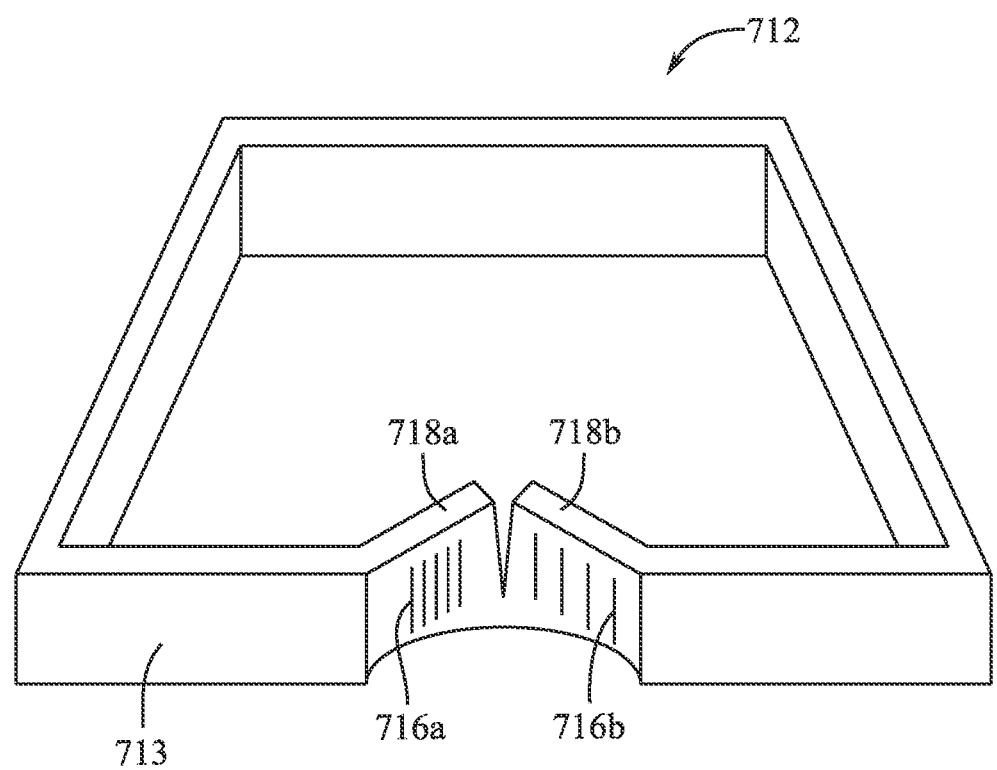
FIG. 7 shows a bottom perspective view of a light seal.

FIG. 7 shows a bottom perspective view of a light seal 712. The light seal 712 can be substantially similar to, including some or all of the features of, any of the light seals described herein, such as light seal 112, 212, 312, and 612. The light seal 712 can include a cover 713 and a first and second nasal sections 718a and 718b, respectively (collectively referred to as nasal sections 718). In some examples, the light seal can include an array of conductive threads 716a and 716b (collectively referred to as the array of conductive threads 716). The array of conductive thread 716 can be arranged parallel to one another such that changes in a distance separating the parallel threads is detectable and can be used to infer nasal movements and respiration data, such as instantaneous estimation of breath amplitude. The parallel conductive threads 716 can be arranged perpendicular to the direction of travel or deformation of the nasal regions 718.

For example, it can be seen in FIG. 7 that the distances separating the first array of conductive threads 716a is less than the distances between the threads of the second array of conductive threads 716b. It can therefore be determined (e.g., by a processor) that the first nasal section 718a is being compressed and/or the second nasal section 718b is being stretched.

It will be understood that location of the array of conductive threads 716 is not limited to the nasal sections 718. For example, any of the conductive fabrics described herein can instead be arranged as a parallel array of conductive threads.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

In some examples, the present exemplary systems and methods can use personally identifiable information. In instances where personally identifiable information is used, such use of personally identifiable information should follow privacy policies and practices that are generally recognized as meeting or exceeding industry or governmental requirements for maintaining the privacy of users. Personally identifiable information data should be managed and handled so as to minimize risks of unintentional or unauthorized access or use, and the nature of authorized use should be clearly indicated to users.

The foregoing description used specific, though exemplary, nomenclature to provide a thorough understanding of the described embodiments. It should be apparent to one skilled in the art that the specific details are not required in order to practice the described examples. Thus, the foregoing descriptions of the specific embodiments and examples described herein are presented for purposes of illustration and description only. They are not intended to be exhaustive or to limit the embodiments to the precise forms disclosed. Many modifications and variations are possible in view of the above teachings.

What is claimed is:

1. A head-mountable device comprising:
   a display;
   a housing at least partially surrounding the display;
   a facial interface attached to the housing; and
   a cover positioned between the housing and the facial interface, the cover comprising a first material and a second material, wherein the second material comprises a conductive fabric extending between the facial interface and the housing, the conductive fabric configured to detect a user input from a hand of user, received on the cover between the facial interface and the housing.

2. The head-mountable device of claim 1, wherein:
   the facial interface directly contacts a face of a user;
   the cover blocks ambient light;
   the conductive fabric elastically deforms in response to a movement of the cover; and
   an electrical property of the conductive fabric detectably changes in response to the movement.

3. The head-mountable device of claim 1, wherein the conductive fabric is elastic.

4. The head-mountable device of claim 1, wherein the conductive fabric is interwoven with the cover.

5. The head-mountable device of claim 1, wherein a geometry of the conductive fabric changes in response to the user input.

6. The head-mountable device of claim 1, wherein the conductive fabric is configured to detect a change in a distance between the housing and the facial interface.

7. The head-mountable device of claim 1, wherein the conductive fabric forms a serpentine pattern.

8. The head-mountable device of claim 1, wherein the conductive fabric comprises an array of parallel conductive threads arranged perpendicular to a direction of deformation of the cover.

9. The head-mountable device of claim 8, wherein a distance between two of the parallel conductive threads changes in response to a facial movement of a user.

10. The head-mountable device of claim 1, wherein the conductive fabric comprises a user input member.

11. A wearable electronic device, comprising:
    a display;
    a frame at least partially surrounding the display; and
    a light-blocking material attached to the frame and extending from the frame to define a thickness, the light-blocking material comprising a first material disposed within the thickness and a second material disposed within the thickness, wherein the second material is a conductive fabric configured to detect a physiological feature of a user based on a facial movement of the user.

12. The wearable electronic device of claim 11, wherein the conductive fabric elastically deforms in response to the facial movement of the user.

13. The wearable electronic device of claim 11, wherein a capacitance of the conductive fabric detectably changes in response to a deformation of the conductive fabric.

14. The wearable electronic device of claim 11, wherein the conductive fabric comprises a switch.

15. The wearable electronic device of claim 11, wherein the conductive fabric electrically connects a first electronic component and a second electronic component.

16. The wearable electronic device of claim 11, wherein the conductive fabric directly contacts a user's skin.

17. The wearable electronic device of claim 11, wherein the conductive fabric comprises a touch-sensitive input member.

18. A facial interface for a head-mountable device, the facial interface comprising:
- a facial contact;
- a facial interface configured to extend from a frame of the head-mountable device and the facial contact;
- a first material incorporated into the facial interface between the frame and the facial contact;
- a second material incorporated into the facial interface between the frame and the facial contact, the second material comprising a conductive component, the conductive component configured to generate a signal based on a change in a capacitance of the conductive component and configured to detect a user characteristic input indicating a tightness of the head-mountable device on the user; and
- a processor connected to the conductive component.

19. The facial interface of claim 18, wherein the facial contact is positioned adjacent a nasal region when the head-mountable device is worn by a user.

20. The facial interface of claim 18, wherein the conductive component is configured to detect a facial expression.

* * * * *